W. CAVES & T. J. SAWYER.
BRAKE FOR LOGGING WHEELS.
APPLICATION FILED DEC. 7, 1911.

1,059,031.

Patented Apr. 15, 1913.

Witnesses
Howard Walmsley,
Harriet L. Hammaker

Inventors
William Caves,
Thomas J. Sawyer,
By Toulmin & Reed
Attorneys

COLUMBIA PLANOGRAPH CO., WASHINGTON, D. C.

UNITED STATES PATENT OFFICE.

WILLIAM CAVES, OF BLACK RIVER FALLS, WISCONSIN, AND THOMAS J. SAWYER, OF ALBUQUERQUE, NEW MEXICO.

BRAKE FOR LOGGING-WHEELS.

1,059,031. Specification of Letters Patent. Patented Apr. 15, 1913.

Application filed December 7, 1911. Serial No. 664,358.

*To all whom it may concern:*

Be it known that we, WILLIAM CAVES, residing at Black River Falls, in the county of Jackson and State of Wisconsin, and THOMAS J. SAWYER, residing at Albuquerque, in the county of Bernalillo and State of New Mexico, both citizens of the United States, have invented certain new and useful Improvements in Brakes for Logging-Wheels, of which the following is a specification, reference being had therein to the accompanying drawing.

This invention relates to brakes for logging wheels.

The object of the invention is to provide a brake by means of which vehicles of this character may be controlled.

The vehicles known as "logging wheels" comprises an axle carried by wheels of large diameter and having connected thereto a tongue. The log is supported beneath the axle and is elevated from the ground by throwing the tongue to some extent above its substantially horizontal position, which it normally occupies and chaining the log to the axle in such a manner that when the tongue is drawn down to its normal position the axle will tend to wind up the chain and lift the log.

In order to secure a brake which will operate efficiently upon the wheels under all conditions it is a further object of the invention to provide means for supporting a brake beam from the axle and for manipulating this brake beam from a point in front of the wheels to cause the brake shoes to engage the wheels.

Figure 1:
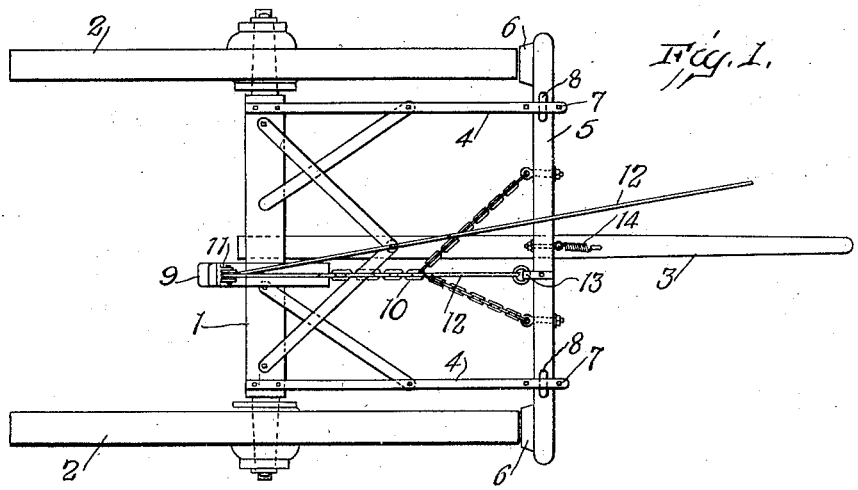
Figure 2:
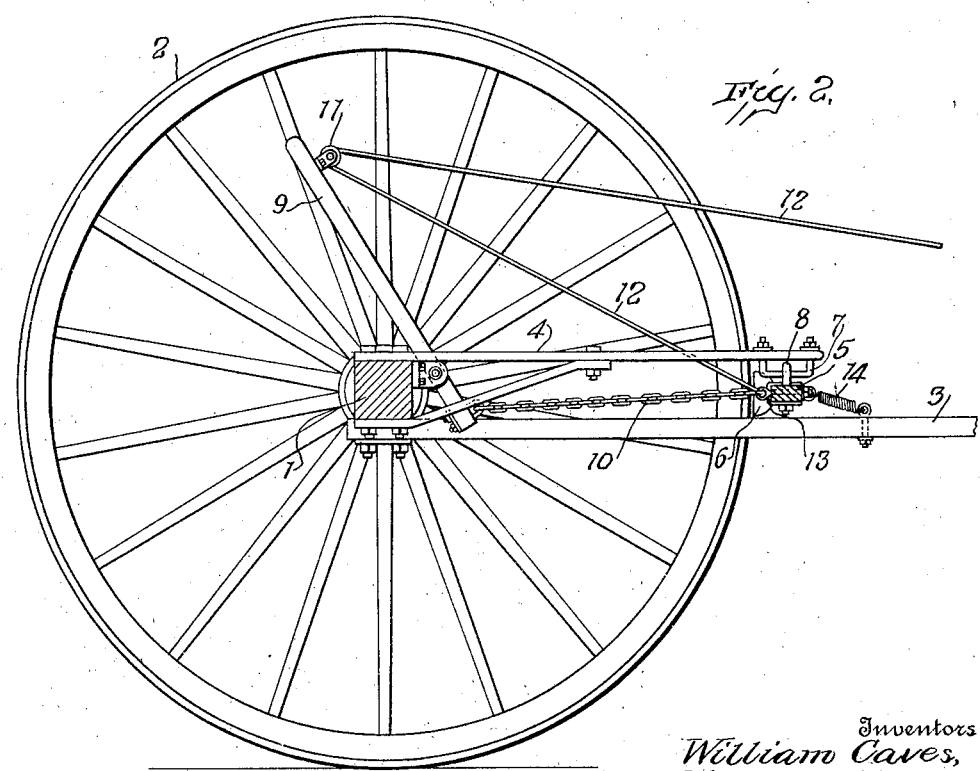

In the accompanying drawings, Figure 1 is a top plan view of a pair of logging wheels equipped with our brake; and Fig. 2 is a sectional view taken just inside of one of the wheels, showing the brake mechanism in elevation.

In these drawings we have illustrated one embodiment of our invention and have shown the same as applied to logging wheels comprising an axle 1 and ground wheels 2. A tongue 3 is rigidly secured to the axle and the team may be hitched to the tongue in any suitable manner, as by looping a chain about the tongue.

Rigidly secured to the axle 1 and projecting forwardly therefrom are two arms 4 which extend to a point beyond the peripheries of the wheels and have movably mounted thereon a brake beam 5 which is arranged above the tongue 3 and which carries the brake shoes 6. The connection between the brake beam and the arms is preferably formed by providing each arm with a clip 7 which depends beneath the same and has a substantially horizontal portion adapted to receive an eye-bolt 8 which extends through the adjacent end of the brake beam. The length of the horizontal portion of the clip is suuh as to allow the brake beam sufficient radial movement to cause the shoes to move into and out of engagement with the wheel.

Movement may be imparted to the brake beam in any suitable manner. In the present instance we have pivotally mounted a lever 9 on the axle 1 near the center thereof. The lower end of this lever extends beneath its pivotal center and has connected thereto one end of a chain 10, the other end of which is branched and connected with the brake beam on opposite sides of the center thereof. The upper end of the lever 9 is provided with means whereby it may be actuated from a point in front of the wheels. Preferably, the lever has secured thereto a guideway, such as a small pulley 11, through which passes an operating line 12, one end of which is secured to the brake beam, as indicated at 13. It will be apparent that a pull on the free end of the line 12 will move the upper end of the lever forward and the lower end of the lever rearward, thus exerting a pull on the chain 10 and imparting radial movement to the brake beam 5.

If desired a spring 14 may be connected with the brake-beam and with the tongue in such a manner that it will tend normally to hold the brake-beam in its retracted position.

The operation of the brake will be readily understood from the foregoing description and it will be apparent that the brake beam is suspended from the axle and is thus maintained in its proper operative relation to the wheels regardless of the position of the tongue and that the device can be readily operated by the driver from his position on the log in advance of the wheels.

While we have shown and described one embodiment of our invention it will be understood that this is chosen for the purpose of illustration only and that we do not desire to be limited to the details of construction shown and described, for obvious modifications will occur to a person skilled in the art.

Having thus fully described our invention, what we claim as new and desire to secure by Letters Patent, is:—

1. The combination, with an axle, ground wheels carried thereby, and a tongue rigidly secured to said axle, of a brake beam, means rigidly secured to said axle to support said brake beam between said tongue and said means, and means operatively connected to said brake beam and adapted to move it in a line substantially parallel with said supporting means and said tongue.

2. The combination, with an axle, ground wheels carried thereby, and a tongue rigidly secured to the lower portion of said axle, of a brake beam arranged above said tongue, arms rigidly secured to the upper portion of said axle and above said tongue, means for slidably connecting said beam to said arms so that said beam will be out of engagement with said tongue and said arms, a lever pivotally mounted between its ends on the front side of said axle and near the top thereof, means for connecting one end of said lever to said brake beam and adapted to draw upon said beam in a line substantially parallel with said arms and said tongue, and means extending from the other end of said lever to a point within reach of the driver for imparting movement to said lever.

3. The combination, with an axle, ground wheels carried thereby, and a tongue rigidly secured to one side of the center of said axle, of a brake beam, means rigidly secured to the opposite side of the center of said axle to slidably support said brake beam between said means and said tongue, and means mounted on said axle and operatively connected to said brake beam, whereby the latter may be moved in a line substantially parallel with said tongue.

In testimony whereof, we affix our signatures in presence of two witnesses.

WILLIAM CAVES.
THOMAS J. SAWYER.

Witnesses:
JOSÉ C. ESPINOSA,
JAMES G. LYNCH.

Copies of this patent may be obtained for five cents each, by addressing the "Commissioner of Patents, Washington, D. C."